United States Patent (12) United States Patent
Pfeiffer et al.

(10) Patent No.: US 6,831,773 B2
(45) Date of Patent: Dec. 14, 2004

(54) BIDIRECTIONAL CODING SPLITTER (75) Inventors: Thomas Pfeiffer, Stuttgart (DE); Peter Kersten, Weissach (DE)

(73) Assignee: Alcatel, Paris (FR)

(*) Notice: Subject to any disclaimer, the term of this patent is extended or adjusted under 35 U.S.C. 154(b) by 103 days.

(21) Appl. No.: 10/282,018

(22) Filed: Oct. 29, 2002

(65) Prior Publication Data
US 2003/0086151 A1 May 8, 2003

(30) Foreign Application Priority Data
Nov. 2, 2001 (EP) .......................... 01 440 370

(51) Int. Cl.[7] .............................................. G02F 1/29
(52) U.S. Cl. .................. 359/320; 359/109; 359/115; 398/43; 398/58; 398/59
(58) Field of Search ............................. 359/109, 114, 359/115, 119, 124, 154, 180, 189, 320; 398/58, 59, 60, 109, 110, 43, 182, 202; 341/13, 137; 385/24

(56) References Cited

U.S. PATENT DOCUMENTS

| 4,703,474 | A | | 10/1987 | Foschini et al. |
| 6,025,944 | A | | 2/2000 | Mendez et al. |
| 6,628,864 | B2 | * | 9/2003 | Richardson et al. .......... 385/37 |
| 2003/0035187 | A1 | * | 2/2003 | Richardson et al. ........ 359/189 |
| 2003/0081890 | A1 | * | 5/2003 | Sotobayashi et al. ......... 385/24 |
| 2004/0037500 | A1 | * | 2/2004 | Yoo ............................. 385/31 |

* cited by examiner

Primary Examiner—Ricky Mack
Assistant Examiner—Brandi N Thomas
(74) Attorney, Agent, or Firm—Sughrue Mion, PLLC (57) ABSTRACT It is an object of the invention to provide a network topology for OCDM signals. Coding splitters combining both coding and splitting functions are provided. The coding splitters themselves can be made from cascaded Mach Zehnder filters which are located somewhere in the network and which can be integrated using planar waveguide technologies. Each OCDM transceiver as well as the network is connected to the splitter via a pair of fibers for the two transmission directions. This set-up has the advantage that the same splitter can be used for both directions to and from the transceivers on one side and to and from the network on the other side.

4 Claims, 10 Drawing Sheets

BIDIRECTIONAL CODING SPLITTER

TECHNICAL FIELD

The invention relates to an OCDM system and is based on a priority application No. EP 01440370.3, which is hereby incorporated by reference.

BACKGROUND OF THE INVENTION

Coding filters are used at network terminations. Splitters are used within the network.

SUMMARY OF THE INVENTION

It is an object of the invention to provide an easier and more efficient coding for OCDM signals.

Coding splitters combining both coding and splitting functions are provided.

The coding splitters themselves can be made from cascaded Mach Zehnder (MZ) filters which are located somewhere in the network and which can be integrated using planar waveguide technologies. Each OCDM transceiver as well as the network is connected to the splitter via a pair of fibres for the two transmission directions. This set-up has the advantage that the same splitter can be used for both directions to and from the transceivers on one side and to and from the network on the other side.

The inventive bidirectional coding splitter for OCDM signals includes two optical coding filters having different OCDM codes and being connected to a third optical coding filter having an OCDM code being different from the OCDM codes of the two optical coding filters or via an optical coupler, one port of each of the two optical coding filters being used to transmit signals and a respective complementary port being used to receive signals, and a third port of each of the two optical coding filters being used to transmit and receive signals to/from the third optical coding filter or the optical coupler.

The inventive bidirectional coding splitter advantageously includes the three coding filters being MZ filters and/or Fabry Perot filters, and each of the two coding filters having a lower filter parameter value than the filter parameter value of the third coding filter.

The inventive bidirectional coding splitter advantageously includes the three coding filters being reconfigurable and/or tuneable, e.g. telemetrically.

The inventive complex bidirectional coding splitter for OCDM signals includes two inventive bidirectional coding splitters and an optical coding filter or an optical coupler being connected to both bidirectional coding splitters.

Fewer components are needed.

BRIEF DESCRIPTION OF THE DRAWINGS

FIG. 9 shows a complex network with passive encoding applying the remote coding concept (cf. FIG. 10) and the filter cascade concept (the values of the differential delays given for the MZ filters at the combination points are taken from the discussion in the previous section of this chapter related to FIG. 19).

BEST MODE FOR CARRYING OUT THE INVENTION

Figure 1:
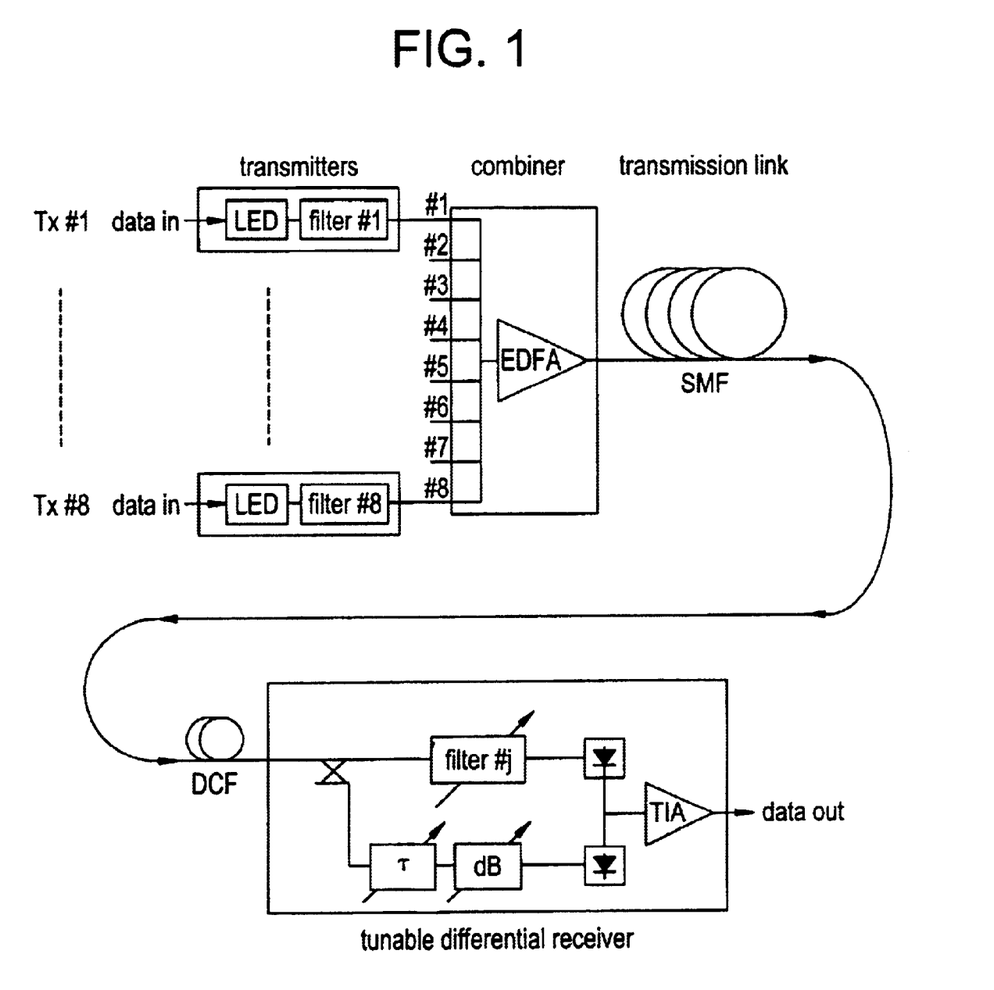
FIG. 1 shows the principle set-up of an OCDM system applying spectral coding of broadband sources.

FIG. 1 shows a typical system set-up that includes the main functional blocks required for a transmission system based on this kind of OCDM. This simple set-up serves as the basis for the following introduction to the technology although other, more complex but basically similar implementations are as well possible and will be shown in succeeding chapters of this report.

The optical output power of thermal light sources, like LEDs, is intensity modulated by the electrical data ("on-off-keying"). The broadband optical emission spectrum of the LED is then shaped using passive filters. The special structure of the filtered emission spectrum is unique in the considered network and serves as the code for the respective optical channel. After transmission through the fibre network (eventually including amplification and dispersion compensation) it can be unambiguously decoded by a matched, also passive, decoding filter at the receiver. Since the optical codes cannot be perfectly separated from each other in the optical domain using passive optical filters (the codes are not strictly orthogonal in the optical domain), a differential receiver set-up is required in an on-off-keying system to suppress crosstalk from other channels.

The spectral coding of the sources can be performed in a number of different ways. One common approach employs spectral coding with irregular spectral patterns called m-sequences. This generally requires complex optical filters and does not show some of the important advantageous features of the inventive OCDM system (e.g. robustness to temperature induced code drift, independence of operation with respect to source spectrum etc., cf. next section). A simpler and more robust way to encode the spectrum is by using optical delay line filters, either with finite impulse response (FIR) or with inifinite impulse response (IIR). Generally such filters exhibit periodic transmission functions in the optical frequency domain. This results in an increased tolerance in the selection requirements and drift of the source spectra and in the required accuracy of the filter coding function (e.g. position in the optical frequency domain). Moreover such delay line filters can be integrated using planar waveguide technologies as they are used for e.g. AWG filters for DWDM systems. The most simple examples of such filters are Mach-Zehnder (MZ, FIR type) or Fabry-Perot (FP, IIR type) filters. They will form the basis for the following introduction into the OCDM technique and for some of the network scenarios proposed afterwards. Further below in this report more advanced networks will be proposed that incorporate more complex delay line filters and combinations of such filters.

Simple delay line filters like MZ or FP are most conveniently characterized by the periodicity of their filter function (mostly used in transmission), the Free Spectral Range (FSR) which is related to the single pass differential delay (in MZ) or round trip time (in FP) $\tau$ via $FSR=1/\tau$. In the network different FSR are allocated to different optical channels. At the receiver the optical decoding filter also exhibits a periodic transmission function with its FSR matched to the FSR of the desired channel. The filter types at transmitter and receiver do not have to be identical, only the FSR or the round trip times $\tau_{Tx}$ and $\tau_{Rx}$ for the transmitter and receiver filter, respectively, must be matched to detect maximum signal power on the photodiode (FIG. 2).

Figure 2:
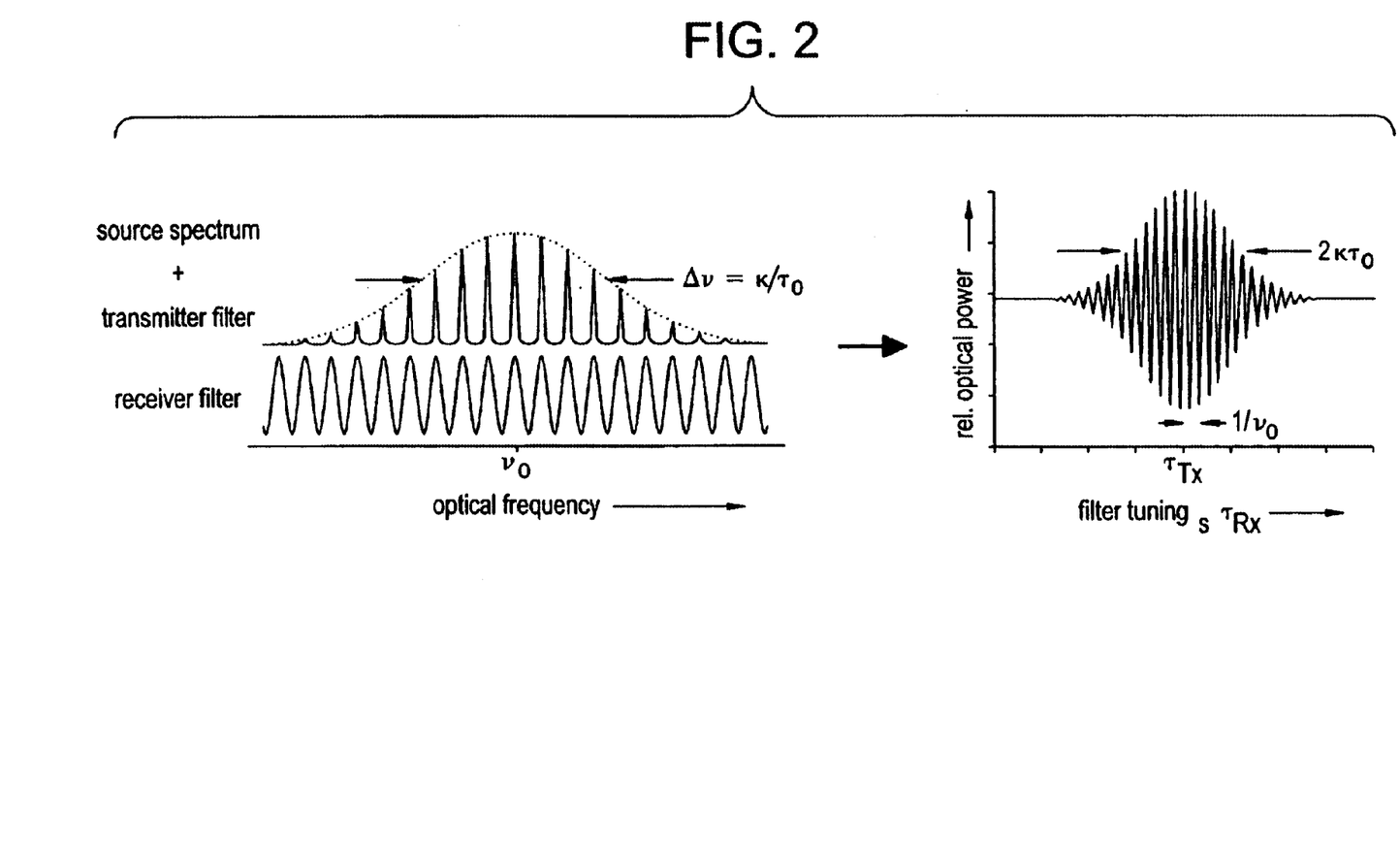
FIG. 2 shows the principle of periodic spectral encoding and decoding (left). Received optical power with single-ended detection around point of optimum tuning $\tau_{Rx}=\tau_{Tx}$ (right).
Figure 3:
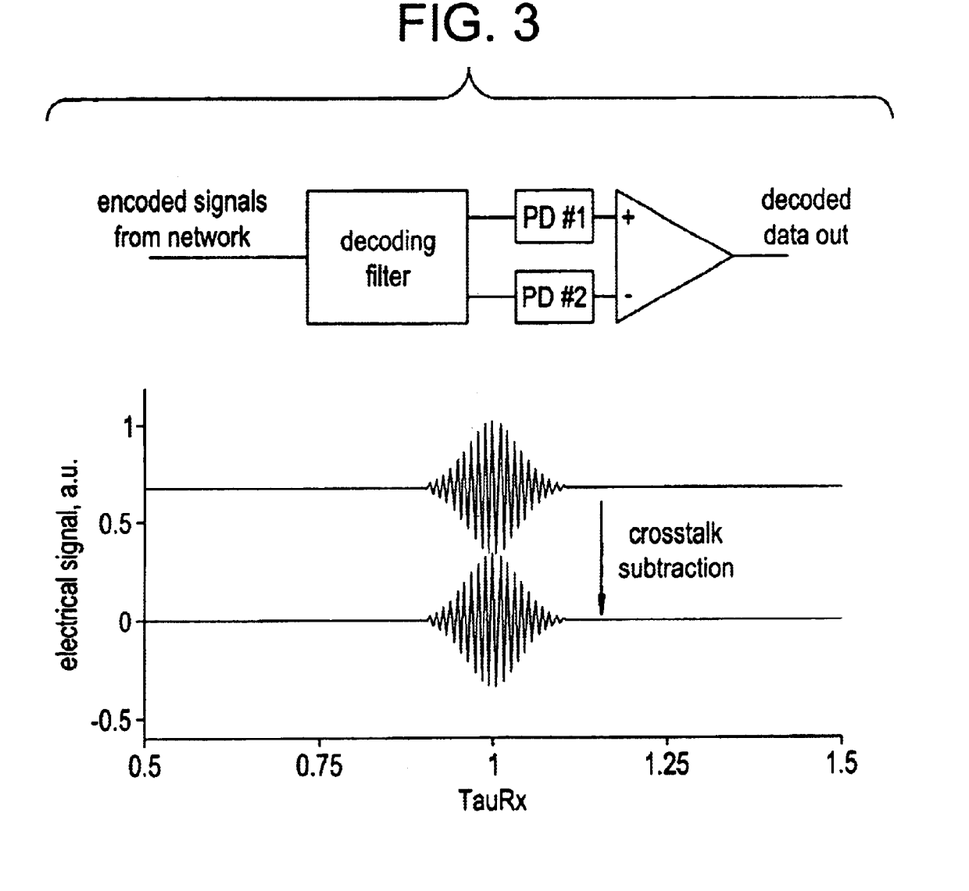
FIG. 3 shows a differential receiver: principle set-up (top) and principle of crosstalk subtraction (bottom).

As can be seen from FIG. 2 (right) even for severely mismatched coding and decoding filter FSR (or for mismatched $\tau_{Tx}$ and $\tau_{Rx}$) there remains a certain level of detected power on the photodiode giving rise to crosstalk in a multichannel system. In principle the crosstalk can be minimized by an optimized choice of encoding/decoding filters, but in all practical cases there remains an untolerable level of crosstalk with single-ended detection. In an on-off-keying system the crosstalk con be almost completely eliminated by utilization of a differential receiver set-up as it is depicted in FIG. 1. The optical signal on the reference arm is either extracted from a second output of the optical decoding filter (e.g. the second output arm in case of a MZ Rx filter) or by tapping part of the total optical input power before the decoding filter (cf. FIG. 1). With proper adjustment of the relative level and delay of the signals propagating on the two receiver arms the constant offset of the tuning curve is removed (FIG. 3).

As a general rule of thumb it can be stated that the kind of OCDM system considered here is based on the fact that the broadband source spectra are passively filtered and that any "characteristic length" in the structure of the filtered source spectrum is "short" compared to the width of the source spectrum. The filtered spectrum is periodic with a period equal to the largest of those "characteristic lengths". The characteristic length in a system based on coding using a single periodicity in the transmitter spectrum is equal to the Tx filter FSR with values ranging from 10 to 20 GHz, whereas the source spectral width at the receiver (after optical amplification and eventual coarse wavelength filtering) is >1 THz.

Figure 4:
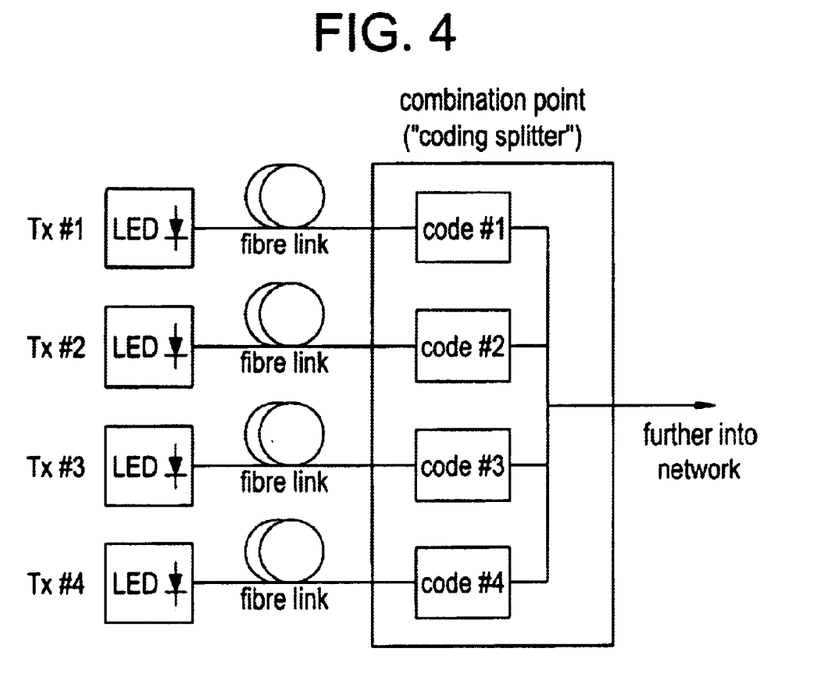
FIG. 4 shows part of an OCDM system with identical uncoded transmitters and "remote coding" at the first combination point in the network.
Figure 8:
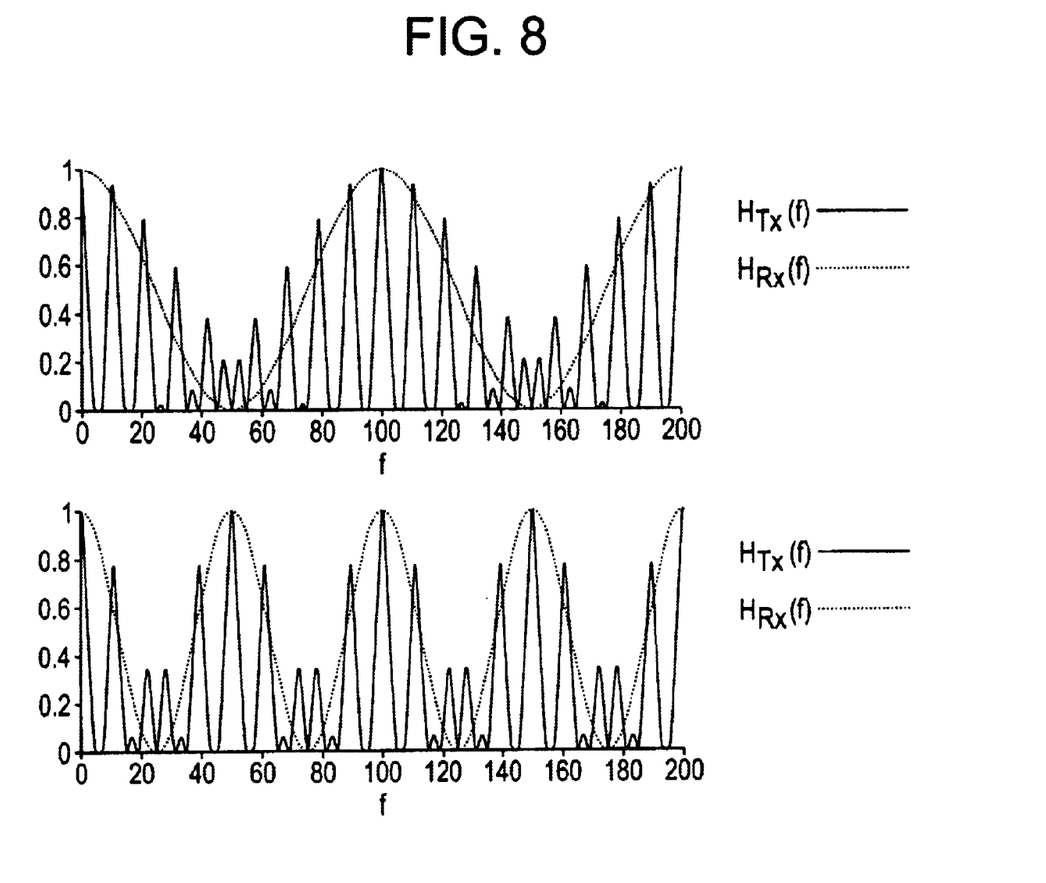
FIG. 8 shows a power transmission function of cascaded MZ filters in FIG. 16 with different values of $T_{02}$. Parameters are $T_{01}=100$ ps in both cases, $T_{02}=90$ ps (top) and $T_{02}=80$ ps (bottom).

The presented spectrally coded system is transparent with respect to transmitted signal characteristics like bitrate and modulation format and requires only loosely specified components. The fact that optical signal generation (LED) and channel allocation (passive optical filter) are performed by separate components has some advantageous implications on component selection and system design:

1. It is sufficient to supply only one type of active component (LED) for a complete multichannel system without the need for differentiating between components for individual optical channels. This active component does not need to be tightly specified nor controlled as long as the emission spectrum is wide enough to cover the relevant wavelength range. This latter constraint becomes important as soon as optical amplifiers are involved or as coarse wavelength multiplexing is introduced (cf. below). The type of active component used may even be varied within the same system, it may be different types of LED or it might as well be some superluminescent light source like SLED or SOA (e.g. by modulating the ASE output power via the injection current)
2. The filters used for channel encoding do not have to be placed directly at the transmitter location, but may as well be placed somewhere in the field, e.g. at the first combination point where signals originating from several optical transmitters are combined onto a common transmission fibre (FIG. 4). Then the combining passive splitter can be integrated together with the encoding filters applying e.g. planar waveguide techniques. Due to the insensitivity of the codes to temperature variations this "coding splitter" can indeed be placed in the field in an outdoor box without requiring active temperature stabilization. The optical transmitter hardware can be identical for all nodes, just having to supply the intensity modulated broadband spectra.
3. Generally the emission spectra of the broadband sources (LED, SLED or SOA) are several 10 nm wide (typically $FWHM_\lambda=50–70$ nm). By using an additional optical bandpass filter with sufficiently large bandwidth (rectangular shape, bandwidth e.g. 10 nm) a corresponding part of the encoded signal can be sliced out of the total spectrum without loosing the code information. Within this sliced band many OCDM channels can be allocated. The exact center wavelength of the band can be choosen arbitrarily within the limits of the emission spectrum of the sources. The slicing of the wavelength bands can be performed for many OCDM channels simultaneously using a single band filter. For instance the coding splitter at the combination point in FIG. 8 can be additionally equipped with a band filter, so that the 4 OCDM channels are all allocated to a common wavelength band (FIG. 5).
4. By applying this coarse wavelength multiplexing concept the flexibility in network design is largely increased. It enables e.g. simultaneous operation of OCDM systems and DWDM systems over the same fibre. Alternatively several wavelength bands can be reserved for different OCDM systems in a complex network. FIG. 6 shows a network scenario (operation in upstream direction is considered towards the headend), where the band slicing is simultaneously performed for the OCDM transmitters (in secondary ring) by a wavelength band multiplexer placed at the connection point to the primary ring. The set of codes used in the secondary rings can be identical for the different rings #1 . . . #4 (code reuse). This reduces the required number of different encoding/decoding filters by a factor equal to the number of wavelength bands (=4 in FIG. 6). For the band slicing only one slicing filter is required for all transmitters in a wavelength band. In networks with few wavelength bands with moderate width (4*10 nm in FIG. 6) the optical sources can be the same type in all transmitters throughout the network without requirement for tight selection of wavelengths.
5. The coding splitter in FIGS. 4, 5 can be used to perform the encoding remotely in the field.

The systems described so for including the numerical examples were all based on approaches using very simple optical filters for encoding and decoding. This assumption was made for ease of demonstrating the principle feasibility of such concepts. It is foreseen that with more sophisticated optical filters the limits on simultaneous channels and/or on bitrates will be pushed to higher values. Another reason for looking into more complex optical filters (still based on the optical delay line filter concept) is that they enable additional attractive features for channel allocation and reconfiguration in complex networks. This will be presented further below. First some concepts for more advanced optical encoding and decoding filters will be sketched.

The coding scheme used in the OCDM approach described in the previous chapters is generally based on passive coding of broadband sources with the condition that the code pattern shows a periodical structure. From this the above described advantageous features of the system arise like insensitivity with respect to to source spectrum and to the exact position of the spectral code pattern (implying e.g insensitivity to temperature variations).

The periodicity of the code spectrum does, however, not have to be based on a simple period in the spectral pattern, but may be rather comprised by the superposition of several different periodicities. This leads to the general concept of encoding and decoding using any form of optical delay line filters, either single stage as in the examples above, or cascaded or in other similar forms as will be described now.

Figure 7:
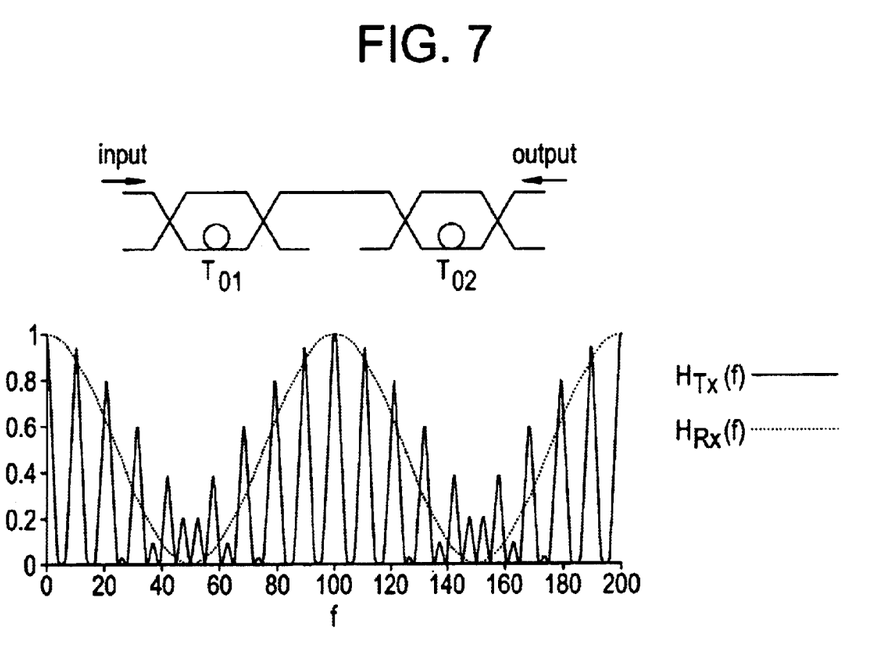
FIG. 7 shows cascaded MZ filters and combined power transmission function (red solid line) for $T_{01}=100$ ps and $T_{02}=90$ ps.

A very simple, but instructive example of cascaded delay line filters is shown in FIG. 7, where two MZ filters with different $T_0$ (=1/FSR) are linked together.

The combined power transmission function $H(v)$ of both filters is also shown in FIG. 7. It is given by the product of the single stage functions and consists of 5 different terms:

$$H(v)=\tfrac{1}{4}\{1+\cos[2\pi v T_{01}]+\cos[2\pi v T_{02}]+\tfrac{1}{2}\cos[2\pi v(T_{01}-T_{02})]+\tfrac{1}{2}\cos[2\pi v(T_{01}+T_{02})]\}$$

Each of the terms within the outer brackets (except the constant "1") or combinations of those can in principle be used for encoding or decoding purposes. The dashed line in FIG. 7 e.g. indicates the behaviour of the third cos-term including the difference of delays $T_{01}-T_{02}$.

The term depending on the sum $T_{01}+T_{02}$ offers an important advantage in the implementation of encoding filters. In this case a complete Tx filter consists of the two MZ filters shown in FIG. 7 where $T_{01}$ and $T_{02}$ are chosen to be substantially different from each other. With e.g. 9 different filter parameter values $T_{01}$=100, 120, 140, 160, 180 ps and $T_{02}$=12, 14, 16, 18 ps there can be 20 different codes implemented based on the sum of differential delays: $T_{01}+T_{02}$=112, 114, 116, 118, 132, 134, 136, ... 176, 178, 192, 194, 196, 198 ps. The Rx filter in this case would be a single stage MZ filter. (The difference $T_{01}-T_{02}$ may as well be utilized for encoding in this kind of application). With proper adjustment of the round trip times $T_{01}$ and $T_{02}$ it is possible to implement N codes by needing only $2\sqrt{N}$ different filter parameter values (in case of cascades of 2 stages). With more stages even more codes can be realized with a small number of different constituent filters.

This is only a simple example of how a cascade of filters can be used in a system to simplify encoding and decoding. Only the single terms in the combined transmission function have been taken as code. Alternatively a combination of several terms or more complex structures consisting of more than two cascaded filters can also be taken into consideration for either encoding or decoding. The figures for the round trip times as given in the above examples are just for illustration purposes. For real applications they have to be optimized in view of practical implementional issues as well as in view of system performance.

Figure 5:
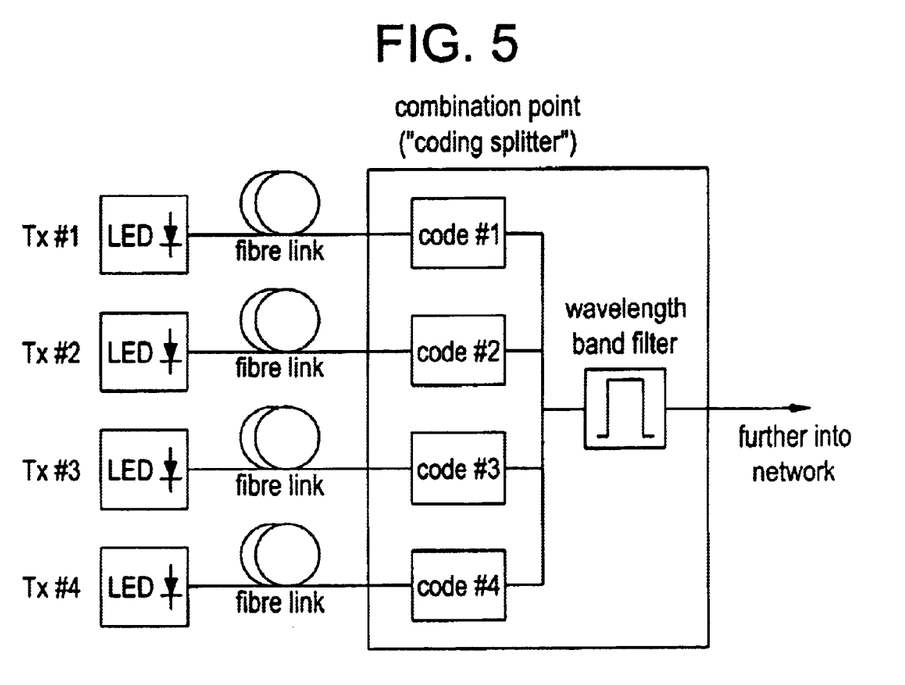
FIG. 5 shows a combination point with "coding splitter" as in FIG. 10, additionally equipped with wavelength band slicing filter.
Figure 6:
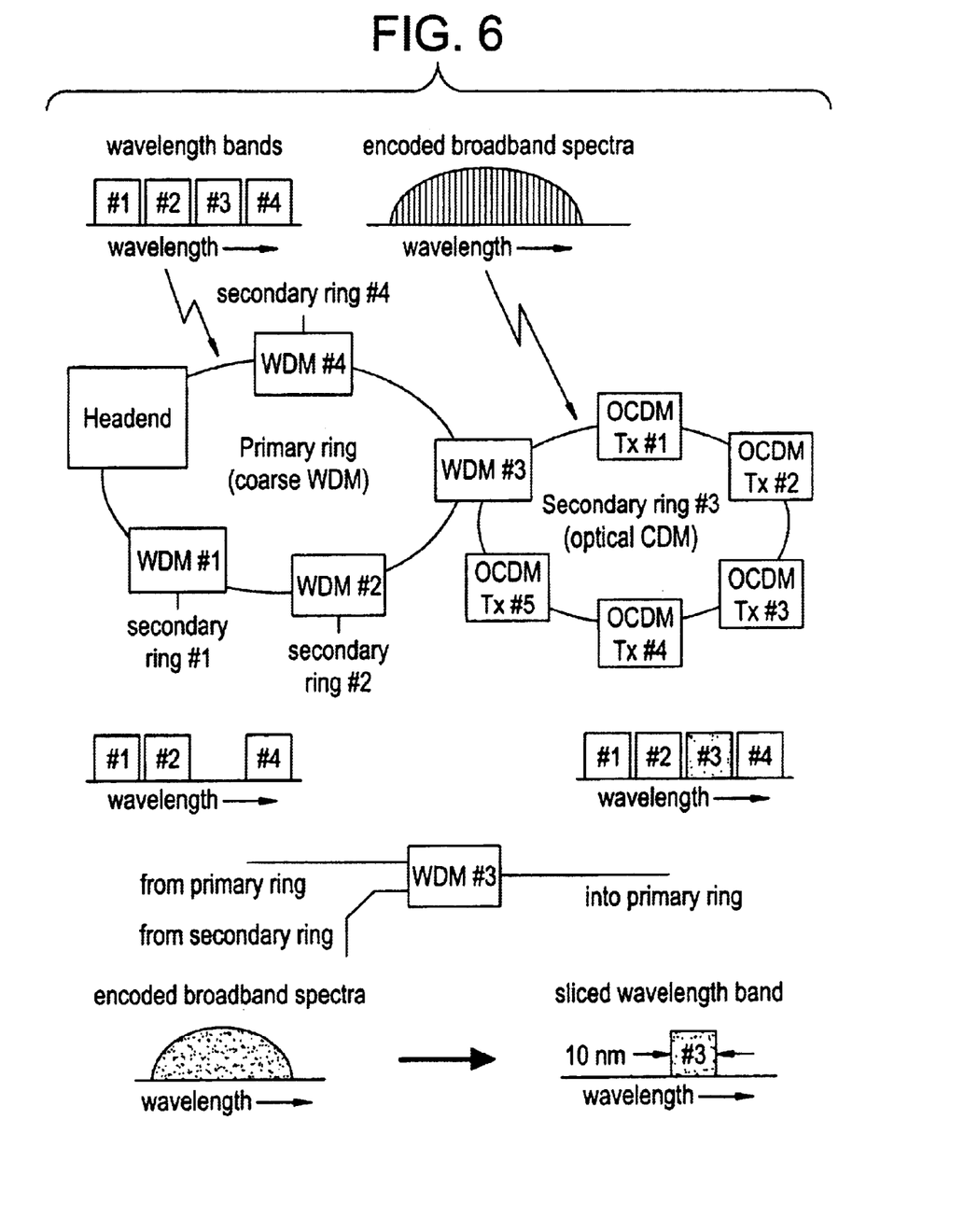
FIG. 6 shows a double ring network including a secondary ring with OCDM transmitters and a primary ring based on coarse wavelength multiplexing. Network architecture (top) and band slicing/multiplexing concept (bottom).
Figure 9:
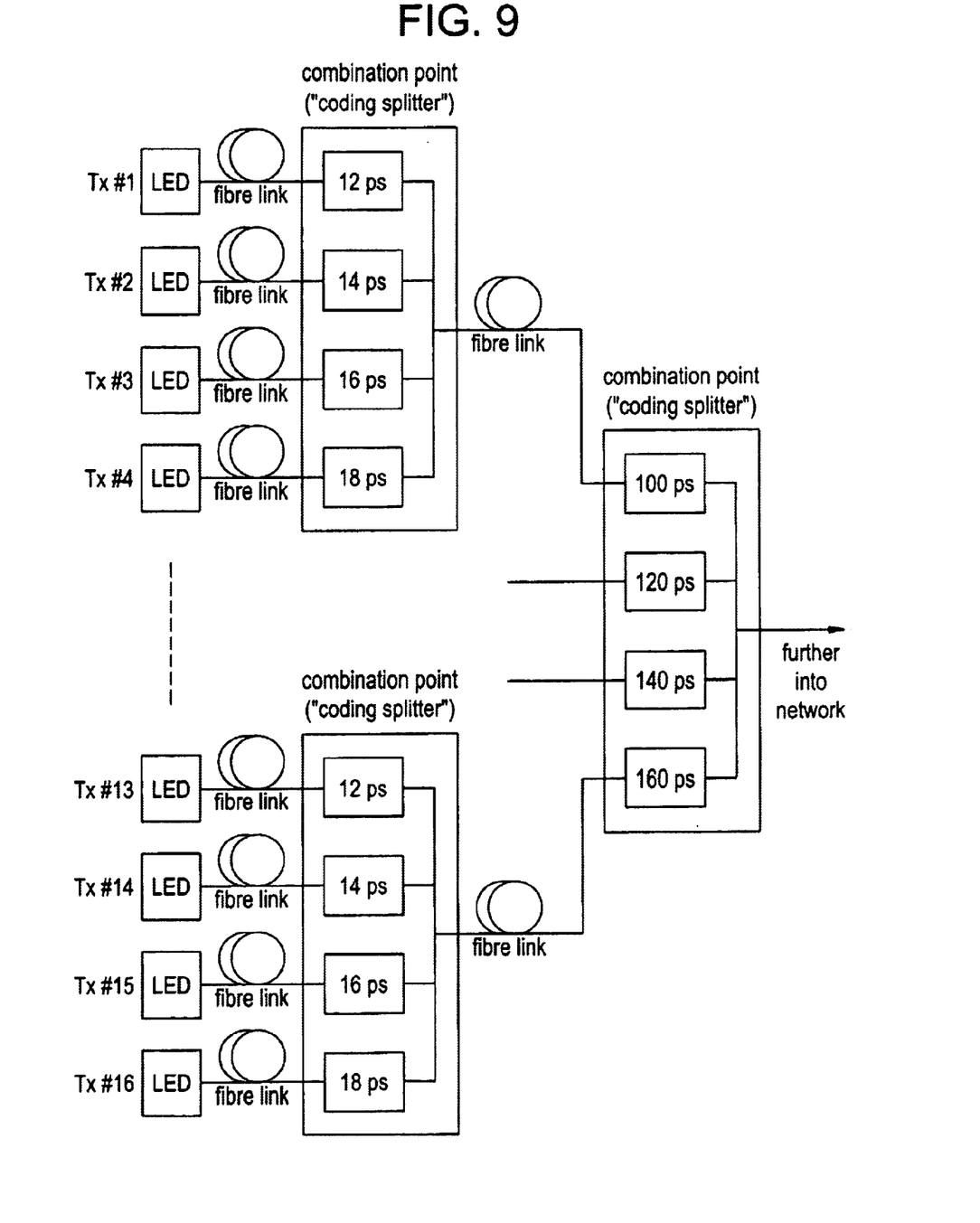

The first example uses cascades of 2 MZ filters as has been shown in FIG. 9 in combination with the remote coding scheme discussed in the context of FIGS. 4 and 5 to encode a large number of OCDM channels (FIG. 9). The encoding is performed at the combination points in the network, the two steps of the encoding process can be geographically separated from each other. This even further reduces the number of required optical filter devices, since groups of codes can now be generated using a single filter device for the second encoding step.

A simple tree-like network architecture has been chosen here to demonstrate the basic idea. Application to other architectures is as well possible.

Figure 10:
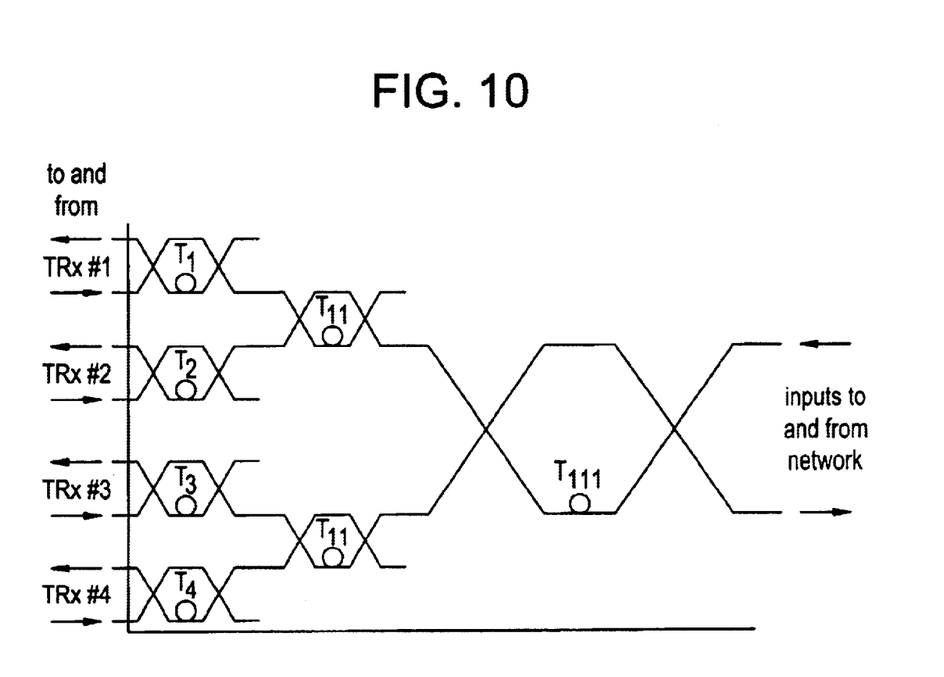
FIG. 10 shows an encoding/decoding splitter made from cascaded MZ filters. $T_1$, $T_2$, $T_3$, $T_4$ are different from each other. Usable channel codes are e.g. given by $(T_1+T_{11}+T_{111})$, $(T_2+T_{11}+T_{111})$, $(T_3+T_{11}+T_{111})$, $(T_4+T_{11}+T_{111})$. The delay $T_{11}$ can also be different for the upper and lower part of the splitter.

The coding splitters themselves can be made from cascaded MZ filters which can be integrated using planar waveguide technologies. Each transceiver as well as the network is connected to the splitter via a pair of fibres for the two transmission directions. This set-up has the advantage that the same splitter can be used for both directions to and from the transceivers on one side and to and from the network on the other side (FIG. 10). The use of coding filters $T_{11}$ is optional, instead optical couplers could be used. Instead of coding filter $T_{111}$ an optical coupler could be used.

Figure 11:
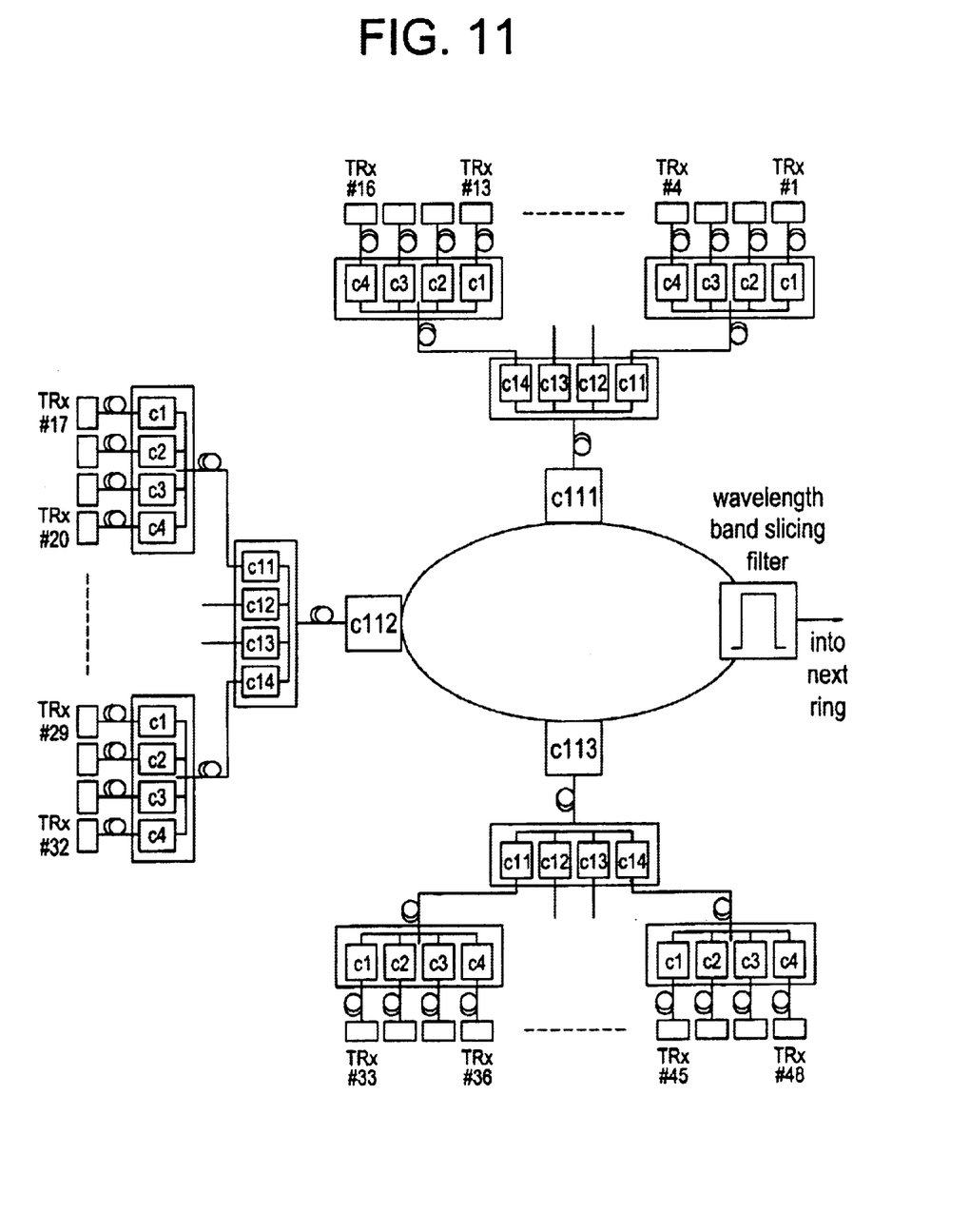
FIG. 11 shows a complex network consisting of different constituting parts as discussed in previous chapters (only schematic network drawing, fibre connections may consist of 2 fibres for bidirectional transmission).

Now all the before demonstrated and discussed features of spectral coding using broadband sources and passive filters can be combined into a complex network as shown in FIG. 11. From the discussions above we now have the single pieces of a construction set to realize complex, yet flexible fiber optic networks with only few different basic components.

The network in FIG. 11 incorporates the concept of remote encoding, i.e. all transmitters are identical, consisting basically only of an optical source. The optical source delivers the modulated, but uncoded broadband emission spectrum. Encoding is performed at the first combination point after the respective source. The codes at the first combination point (c1, c2, c3, c4) are set-wise identical for the multi-transmitter subnetworks. Several groups of transmitters are combined using a second set of codes (c11, c12, c13, c14). The entire group is then encoded a third time (c111, c112, c113) before introduction into the ring network. The coding filters may be simple MZ filters (in that case the single stage codes are represented by the single differential delay of the respective MZ filter) or more complex filters like the ones discussed above. The single optical channels can be identified via the combined optical code (e.g. c1*c11*c112 for the upper left transmitter (TRx #17) or c4*c14*c113 for the lower right transmitter TRx #48). Before the optical signals are transmitted into the next ring, they are spectrally sliced into a wavelength band as discussed in previous chapters of this report. Several such bands, each carrying different OCDM channels, all based on the same set of basic codes, are transmitted in the next ring (cf. FIG. 6).

There are several benefits from this system proposal:

1. all optical sources in the network are identical, all transceiver equipment is hence the same everywhere in the network;
2. there are only few basic codes required for all channels in the network (e.g. 11 different basic codes for 48 channels);
3. the number of filter devices is minimized by application of cascaded and distributed coding;

4. if the coding filters, specially at "higher levels" in the network (e.g. c1x or c11x) are made tuneable or can be switched, then the different channels in the network may be dynamically reconfigured, either into different groups to perform specific tasks as e.g. multicasting, or to redirect the signals of one group of nodes to a special group of receivers (as might be required to perform communication between different nodes in a ring without central headend).

The last point shall shortly be highlighted by looking at a specific example. In a network like the one in FIG. 11, but now with communication between nodes without central headend, consider a group of 4 transmitters (TRx #29 ... TRx #32) that are encoded by the set of codes (c1, c2, c3, c4)*c14*c112. Assume the codes are realized by simple MZ filters characterized by their respective differential delays $\tau=(12, 14, 16, 18 \text{ ps})$ for (c1, c2, c3, c4), $\tau=160$ ps for c14 and $\tau=500$ ps for c112. The signals are detected by a set of 4 receivers somewhere in the network with MZ decoding filters characterized by the differential delays $\tau_{Rx}$. Each of those is matched to the sum of the 3 cascaded differential filter delays used for encoding, i.e. $\tau=(672, 674, 676, 678$ ps). If now c14 is changed from 160 ps to 100 ps, then the signals from the transmitters (TRx #29 ... TRx #32) can now be decoded at receivers with $\tau=(612, 614, 616, 618$ ps). So changing a single basic code leads to a reconfiguration of 4 optical connections. If c112 was changed this would simultaneously have impact on 16 optical connections.

What is claimed is:

1. Bidirectional coding splitter for OCDM signals including two optical coding filters having different OCDM codes and being connected to a third optical coding filter having an OCDM code being different from the OCDM codes of the two optical coding filters or via an optical coupler, one port of each of the two optical coding filters being used to transmit signals and a respective complementary port being used to receive signals, and a third port of each of the two optical coding filters being used to transmit and receive signals to/from the third optical coding filter or the optical coupler.

2. Bidirectional coding splitter according to claim 1, the three coding filters being MZ filters and/or Fabry Perot filters, and each of the two coding filters having a lower filter parameter value than the filter parameter value of the third coding filter.

3. Bidirectional coding splitter according to claim 1, the three coding filers being reconfigurable and/or tuneable.

4. Complex bidirectional coding splitter for OCDM signals including two bidirectional coding splitters according to claim 1 and an optical coding filter or an optical coupler being connected to both bidirectional coding splitters.

* * * * *